United States Patent
Morita

(10) Patent No.: US 11,528,121 B2
(45) Date of Patent: Dec. 13, 2022

(54) RECEIVING DEVICE AND RECEIVING METHOD, AND MOBILE TERMINAL TEST APPARATUS PROVIDED WITH RECEIVING DEVICE

(71) Applicant: ANRITSU CORPORATION, Kanagawa (JP)

(72) Inventor: Atsuki Morita, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/360,422

(22) Filed: Jun. 28, 2021

(65) Prior Publication Data

US 2022/0029777 A1 Jan. 27, 2022

(30) Foreign Application Priority Data

Jul. 22, 2020 (JP) .............................. JP2020-125273

(51) Int. Cl.
*H04L 7/00* (2006.01)
*H04B 17/00* (2015.01)
*H04L 27/26* (2006.01)

(52) U.S. Cl.
CPC ....... *H04L 7/0016* (2013.01); *H04B 17/0085* (2013.01); *H04L 7/0079* (2013.01); *H04L 27/2655* (2013.01)

(58) Field of Classification Search
CPC ............ H04L 27/2655; H04L 27/2657; H04L 27/2662; H04L 27/2679; H04L 27/3872; H04L 7/0016; H04L 7/0079; H04L 27/2647; H04L 27/2649; H04B 17/0085
See application file for complete search history.

(56) References Cited

U.S. PATENT DOCUMENTS

| | | | | |
|---|---|---|---|---|
| 5,959,965 A * | 9/1999 | Ohkubo | ............... | H04L 27/2657 370/320 |
| 7,203,261 B2 * | 4/2007 | Gupta | ................. | H04L 27/2695 375/376 |
| 7,577,206 B2 * | 8/2009 | Kim | .................... | H04L 27/2657 375/326 |
| 2017/0280407 A1 * | 9/2017 | Ronte | ................. | H04L 27/2634 |

FOREIGN PATENT DOCUMENTS

JP 6473429 B2 2/2019

* cited by examiner

*Primary Examiner* — Betsy Deppe
(74) *Attorney, Agent, or Firm* — Pearne & Gordon LLP

(57) ABSTRACT

Included are a demodulation unit that demodulates a received OFDM modulation signal to acquire a demodulated constellation signal, an ideal constellation signal generation unit that generates an ideal constellation signal from the demodulated constellation signal, a data extraction unit that extracts signal data corresponding to subcarriers included in a part of an intermediate frequency section among all frequency sections, from the demodulated constellation signal and the ideal constellation signal, a phase error calculation unit that calculates the phase error of the demodulated constellation signal for the ideal constellation signal, with respect to the extracted signal data, a phase error characteristic estimation unit that estimates the frequency characteristic of the phase error, and a phase error correction unit that corrects the phase error of the demodulated constellation signal, based on the frequency characteristic of the phase error.

9 Claims, 9 Drawing Sheets

RECEIVING DEVICE AND RECEIVING METHOD, AND MOBILE TERMINAL TEST APPARATUS PROVIDED WITH RECEIVING DEVICE

TECHNICAL FIELD

The present invention relates to a receiving device and a receiving method for correcting a phase error of a demodulation signal, and a mobile terminal test apparatus provided with the receiving device.

BACKGROUND ART

In the related art, a transmission test for analyzing a signal transmitted from a Device Under Test (DUT) such as a mobile communication terminal and checking the transmission performance of the DUT has been performed using a mobile terminal test apparatus. The signal transmitted from the DUT is a modulation signal modulated according to a communication standard such as a wireless Local Area Network (LAN), Long Term Evolution (LTE), or 5G New Radio (NR).

In wideband wireless transmission systems such as wireless LAN, LTE, and 5G NR, the Orthogonal Frequency Division Multiplexing (OFDM) method having a good frequency utilization efficiency is widely used as the modulation method. The OFDM method is a block transmission method that synchronizes every predetermined data block. Specifically, the data string is demultiplexed on the transmitting side, converted into parallel data, mapped to each subcarrier, and then an Inverse Fast Fourier Transform (IFFT) process, D/A transformation, orthogonal modulation, or the like are performed to obtain a transmission signal. In addition, after conversion to a signal in the time domain by IFFT process, a part of the rear end of the signal is added to the front of the signal as a guard interval to make it resistant to inter-symbol interference due to multipath fading.

The mobile terminal test apparatus receives and demodulates the modulation signal generated in this manner and performs signal analysis. It is necessary to accurately perform demodulation in order to perform highly accurate analysis. However, for example, in a case where there is a frequency shift between a transmission signal generated by a DUT and a demodulation signal demodulated by a receiving device, a phase error shift (phase rotation) occurs in the demodulation signal, and it is not possible to recognize the accurate transmission performance of the DUT. Therefore, it is necessary to appropriately correct the phase error occurring in the demodulation signal. As an apparatus for correcting the phase error of a demodulation signal, for example, the apparatus described in Patent Document 1 is known.

Patent Document 1 discloses a configuration in which a phase synchronization process is performed by obtaining the frequency-to-phase characteristic from the constellation of the OFDM demodulation signal, changing the phase difference, and searching for the phase difference in which the gradient of the frequency-to-phase characteristic approaches zero.

RELATED ART DOCUMENT

Patent Document

[Patent Document 1] Japanese Patent No. 6473429

DISCLOSURE OF THE INVENTION

Problem that the Invention is to Solve

However, in the apparatus in the related art described in Patent Document 1, it has not been considered to accurately and efficiently acquire the frequency-to-phase characteristic used for the phase synchronization (that is, the correction of the phase error) of the demodulation signal. When the accuracy of the acquired frequency-to-phase characteristic is not high, there is a concern that the phase of the demodulation signal cannot be synchronized accurately and efficiently.

The present invention has been made to solve the above-mentioned problems in the related art, and a purpose thereof is to provide a receiving device and a receiving method capable of accurately and efficiently correcting a phase error of a demodulation signal, and a mobile terminal test apparatus provided with the receiving device.

Means for Solving the Problem

In order to achieve the above object, a receiving device of the present invention includes: a reception unit (10) that receives a modulation signal modulated by an orthogonal frequency division multiplexing (OFDM) method from a mobile communication terminal (2); a demodulation unit (20) that demodulates the received modulation signal to acquire a demodulated constellation signal; an ideal constellation signal generation unit (312) that generates an ideal constellation signal from the demodulated constellation signal; a data extraction unit (313) that selects and extracts a part of signal data from the demodulated constellation signal and the ideal constellation signal; a phase error calculation unit (314) that calculates a phase error of the demodulated constellation signal with respect to the ideal constellation signal, regarding the extracted signal data, a phase error characteristic estimation unit (315) that estimates a frequency characteristic of the phase error, based on the calculated phase error; and a phase error correction unit (316) that corrects the phase error of the demodulated constellation signal, based on the estimated frequency characteristic of the phase error.

As described above, in the receiving device of the present invention, the data extraction unit selects and extracts a part of signal data suitable for a predetermined condition, from the demodulated constellation signal (hereinafter, also simply referred to as the demodulation signal) and the ideal constellation signal. With respect to the extracted signal data, the phase error calculation unit calculates the phase error, and the phase error characteristic estimation unit estimates the frequency characteristic of the phase error (hereinafter, also simply referred to as the phase error characteristic) in the section of the extracted signal data. Then, the phase error correction unit corrects the phase error of the demodulated constellation signal, based on the estimated characteristic of the phase error. In this way, since the characteristic of the phase error can be estimated using only a part of the highly reliable signal data, by correcting the phase error based on the characteristic, the phase error of the demodulation signal can be corrected accurately and efficiently.

Further, in the receiving device of the present invention, the data extraction unit may be configured to extract signal data corresponding to subcarriers included in a part of intermediate frequency section among all frequency sections including all subcarriers, from the demodulated constellation signal and the ideal constellation signal.

When phase rotation occurs in the demodulation signal, the signal data corresponding to the subcarriers included in a part of intermediate frequency section, among all frequency sections including all subcarriers is data which is more highly reliable in estimating the characteristics of the phase error than the signal data of the frequency sections at both ends thereof. Therefore, by estimating the characteristics of the phase error using only such signal data and correcting the phase error based on the characteristics, the phase error of the demodulation signal can be corrected accurately and efficiently.

Further, the receiving device of the present invention may be configured to further include a second correction unit (32) that calculates a phase error between the demodulated constellation signal of which phase error has been corrected by the phase error correction unit and the ideal constellation signal which is regenerated from the demodulated constellation signal of which the phase error has been corrected, estimates the frequency characteristic of the phase error, based on the calculated phase error, and corrects the phase error of the demodulated constellation signal, based on the estimated frequency characteristic of the phase error.

After estimating the characteristic of the phase error using only a part of the highly reliable signal data and performing coarse correction of the phase error based on the characteristic, the second correction unit can correct the phase error of the demodulation signal accurately and efficiently, by estimating the characteristic of the phase error using all pieces of signal data included in all the frequency sections (all subcarrier sections) or all the symbol sections and performing the main correction of the phase error based on the characteristic.

Further, the mobile terminal test apparatus of the present invention includes the receiving device (100) according to any one of the above, an analysis unit (40) that analyzes the demodulated constellation signal of which phase error has been corrected, and a display unit (50) that displays the result of analysis by the analysis unit.

With this configuration, the mobile terminal test apparatus of the present invention can correct the phase error of the demodulation signal more efficiently and accurately, thereby testing the mobile communication terminal accurately.

Further, a receiving method of the present invention includes a reception step (S1) of receiving a modulation signal modulated by an orthogonal frequency division multiplexing (OFDM) method from a mobile communication terminal (2); a demodulation step (S4, S5) of demodulating the received modulation signal to acquire a demodulated constellation signal, an ideal constellation signal generation step (S11) of generating an ideal constellation signal from the demodulated constellation signal; a data extraction step (S12) of selecting and extracting a part of signal data from the demodulated constellation signal and the ideal constellation signal; a phase error calculation step (S13) of calculating a phase error of the demodulated constellation signal with respect to the ideal constellation signal, regarding the extracted signal data; a phase error characteristic estimation step (S14) of estimating a frequency characteristic of the phase error, based on the calculated phase error; and a phase error correction step (S15) of correcting the phase error of the demodulated constellation signal, based on the estimated frequency characteristic of the phase error.

As described above, in the receiving method of the present invention, in the data extraction step, a part of signal data suitable for a predetermined condition is selected and extracted from the demodulated constellation signal and the ideal constellation signal. With respect to the extracted signal data, the phase error is calculated in the phase error calculation step, and the frequency characteristic of the phase error in all the data sections is estimated by the phase error characteristic estimation unit. Then, in the phase error correction step, the phase error of the demodulated constellation signal is corrected based on the estimated characteristic of the phase error. In this way, since the characteristic of the phase error can be estimated using only a part of the highly reliable signal data, by correcting the phase error based on the characteristic, the phase error of the demodulation signal can be corrected accurately and efficiently.

Advantage of the Invention

According to the present invention, it is possible to provide a receiving device and a receiving method capable of accurately and efficiently correcting a phase error of a demodulation signal, and a mobile terminal test apparatus provided with the receiving device.

BEST MODE FOR CARRYING OUT THE INVENTION

Hereinafter, embodiments of the present invention will be described with reference to the drawings.

Figure 1:
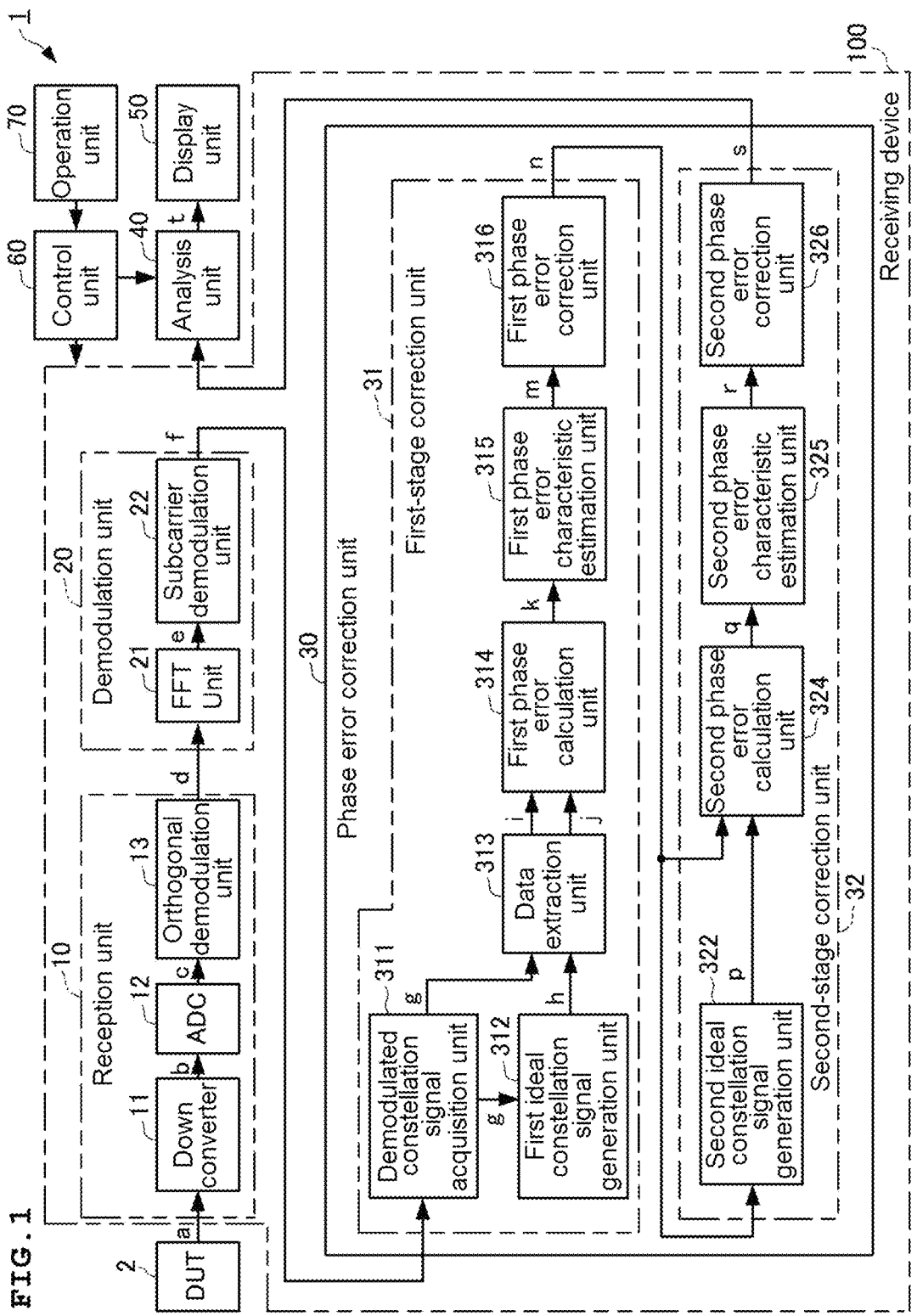
FIG. 1 is a block diagram illustrating a configuration of a mobile terminal test apparatus according to an embodiment of the present invention.

As illustrated in FIG. 1, a mobile terminal test apparatus 1 according to an embodiment of the present invention is configured to receive and analyze a modulation signal a transmitted from a device under test (DUT) 2 and test the transmitting performance of the DUT 2, and includes a reception unit 10, a demodulation unit 20, a phase error correction unit 30, an analysis unit 40, a display unit 50, a control unit 60, and an operation unit 70. The portion including the reception unit 10, the demodulation unit 20, and the phase error correction unit 30 is also referred to as a receiving device 100. Examples of the DUT 2 include, but are not limited to, mobile communication terminals such as smartphones, mobile phones, and tablet terminals. The modulation signal a transmitted from the DUT 2 is an OFDM modulation signal modulated by, for example, an orthogonal frequency division multiplexing (OFDM) method according to a communication standard such as LTE or 5G NR. Hereinafter, each component will be described.

(Reception unit) The reception unit 10 receives the modulation signal a (OFDM modulation signal) transmitted from the DUT 2 via an antenna or by wire, and includes a down converter 11, an analog-to-digital converter (ADC) 12, and an orthogonal demodulation unit 13.

The down converter 11 includes a mixer and a local oscillator, inputs the modulation signal a transmitted from the DUT 2 and the local signal generated by the local oscillator to the mixer, down-converts the input signals, and generates an intermediate frequency (IF) signal b. The intermediate frequency signal b is sent to the ADC 12.

The ADC 12 samples the intermediate frequency signal b, which is frequency-converted by the down converter 11, and converts the sampled intermediate frequency signal b from an analog signal to a digital signal. An obtained digital intermediate frequency signal c is sent to the orthogonal demodulation unit 13.

The orthogonal demodulation unit 13 frequency-converts the digital intermediate frequency signal c output from the ADC 12 into a baseband signal, and orthogonally demodulates it into an I-phase component and a Q-phase component. The obtained orthogonal demodulation signal d is sent to the demodulation unit 20. The orthogonal demodulation signal d is a complex signal.

In the above description, in the reception unit 10, the modulation signal is converted into an intermediate frequency signal by the down converter 11, but may be converted into a baseband signal by the down converter 11. Further, a signal synchronization unit may be provided between the orthogonal demodulation unit 13 and the demodulation unit 20, and symbols or frames may be synchronized with respect to the orthogonal demodulation signal d.

(Demodulation Unit)

The demodulation unit 20 OFDM-demodulates the orthogonal demodulation signal d output from the orthogonal demodulation unit 13 of the reception unit 10, and includes a fast Fourier transform (FFT) unit 21 and a subcarrier demodulation unit 22.

The FFT unit 21 performs a fast Fourier transform process on the orthogonal demodulation signal d output from the orthogonal demodulation unit 13 to generate a frequency domain signal e. If necessary, Cyclic Prefix (CP) is removed from each symbol of the orthogonal demodulation signal d, before the FFT process is performed by the FFT unit 21. The generated frequency domain signal e is sent to the subcarrier demodulation unit 22.

A transmission line estimation/correction unit may be provided between the FFT unit 21 and the subcarrier demodulation unit 22. The transmission line estimation/correction unit corrects the transmission line by estimating the transmission line using, for example, a pilot signal, with respect to the frequency domain signal e output from the FFT unit 21. When the transmission line estimation/correction unit is provided, the corrected frequency domain signal is sent to the subcarrier demodulation unit 22.

The subcarrier demodulation unit 22 performs a demodulation process on the frequency domain signal e for each subcarrier to generate an OFDM demodulation signal f. The OFDM demodulation signal f is sent to the phase error correction unit 30.

The phase error correction unit 30 corrects the phase error of the OFDM demodulation signal f, which will be described in detail later. The OFDM demodulation signal s of which phase error has been corrected is sent to the analysis unit 40.

(Analysis Unit/Display Unit)

The analysis unit 40 is configured to measure and analyze, for example, transmission power, Error Vector Magnitude (EVM), constellation, spectrum, or the like, with respect to the OFDM demodulation signal s of which phase error has been corrected, output from the phase error correction unit 30, and test the transmission performance of the DUT 2. The measurement and analysis result by the analysis unit 40 is sent to the display unit 50.

The display unit 50 displays, on a liquid crystal display or the like, the test result of the DUT 2, including data and graphs of the measurement and analysis result sent from the analysis unit 40.

The operation unit 70 is operated by the user to set parameters such as measurement items and measurement conditions for testing the DUT 2, and determination conditions, and examples thereof include a touch panel, a keyboard composed of hardware keys, an input device such as a dial or a mouse, and a control circuit for controlling these.

The control unit 60 receives an input from the operation unit 70, sets various parameters, and controls functional units such as the reception unit 10, the demodulation unit 20, the phase error correction unit 30, the analysis unit 40, and the display unit 50.

(Data Structure)

Here, an example of the data structure of the modulation signal a transmitted from the DUT 2 will be described.

For example, the modulation signal a is composed of a plurality of consecutive frames when viewed in a time axis direction, and one frame is composed of 10 subframes. The time length of one subframe is 1 ms, so the time length of one frame is 10 ms. The subframe is composed of one or a plurality of slots, and the number of slots included in one subframe is determined according to the subcarrier interval. One slot contains, for example, 14 symbols.

Seen in the frequency direction, the modulation signal a is composed of a plurality of resource blocks, and one resource block includes, for example, 12 consecutive subcarriers.

(Phase Error)

Figure 2A:
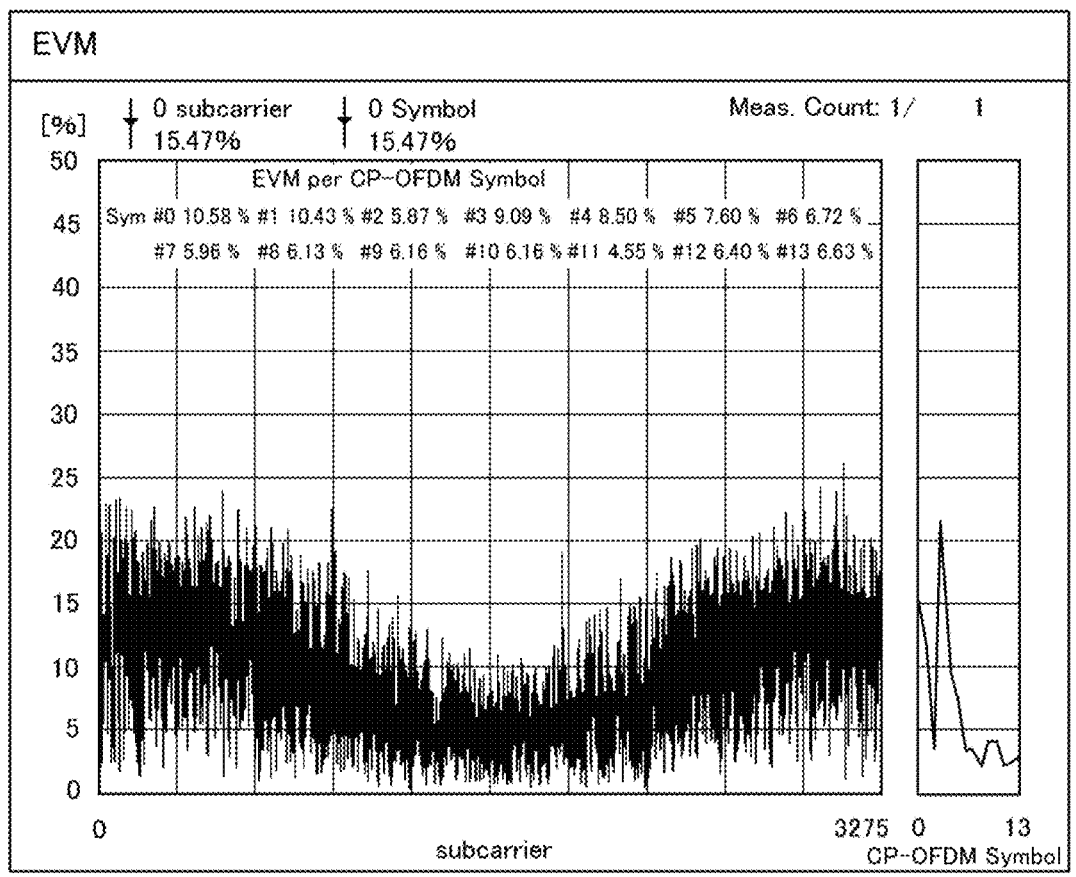
FIG. 2A illustrates a graph of EVM with respect to a subcarrier (frequency)

When the OFDM demodulation signal f contains a large phase rotation, it becomes difficult to accurately evaluate the modulation accuracy. FIG. 2A illustrates, as an example, a graph of EVM with respect to a subcarrier (frequency), for a demodulation signal having a phase rotation. The EVM is small in the central subcarrier section, and the EVM is large in the subcarrier sections at both ends.

Figure 2B:
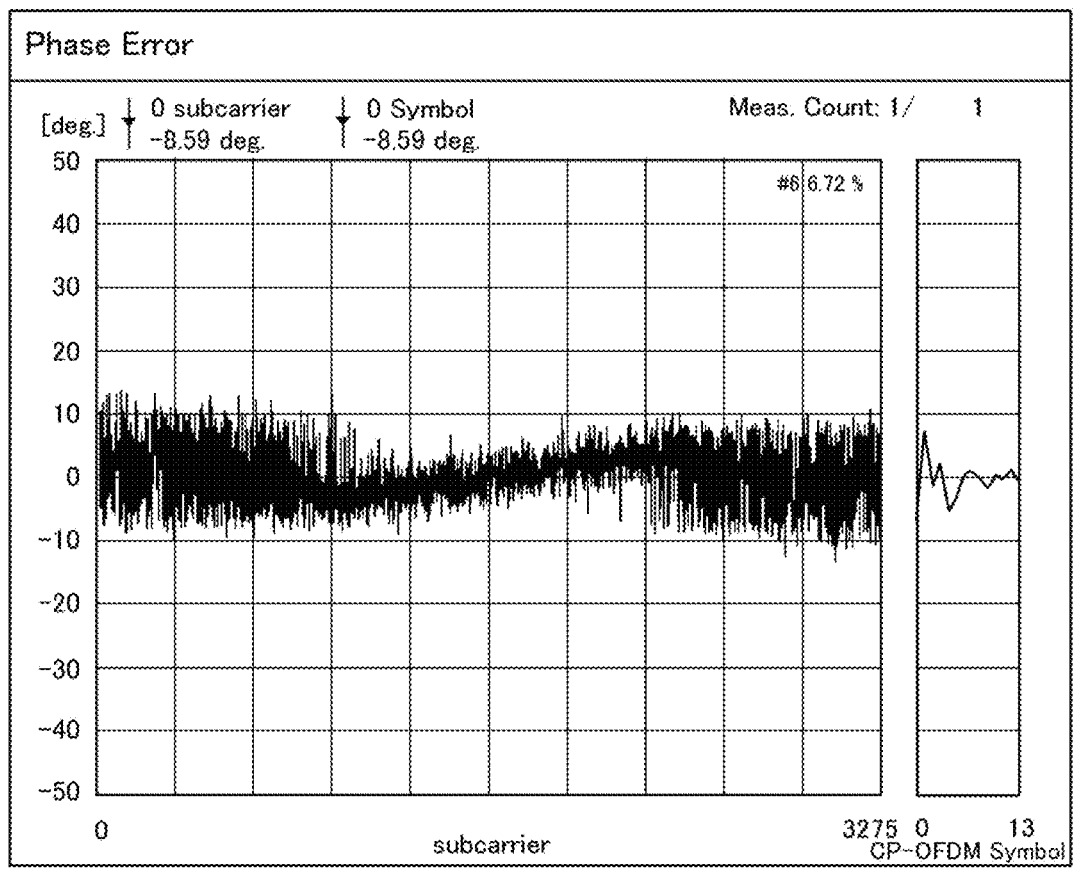
FIG. 2B illustrates a graph of a phase error with respect to a subcarrier (frequency), for a demodulation signal in which a large phase rotation occurs.

FIG. 2B illustrates, as an example, a graph of the phase error with respect to a subcarrier (frequency), for a demodulation signal having a phase rotation. The phase error indicates a linear frequency characteristic inclined in the central subcarrier section, and a linear frequency characteristic as in the center is not recognized in the subcarrier sections at both ends.

Figure 3:
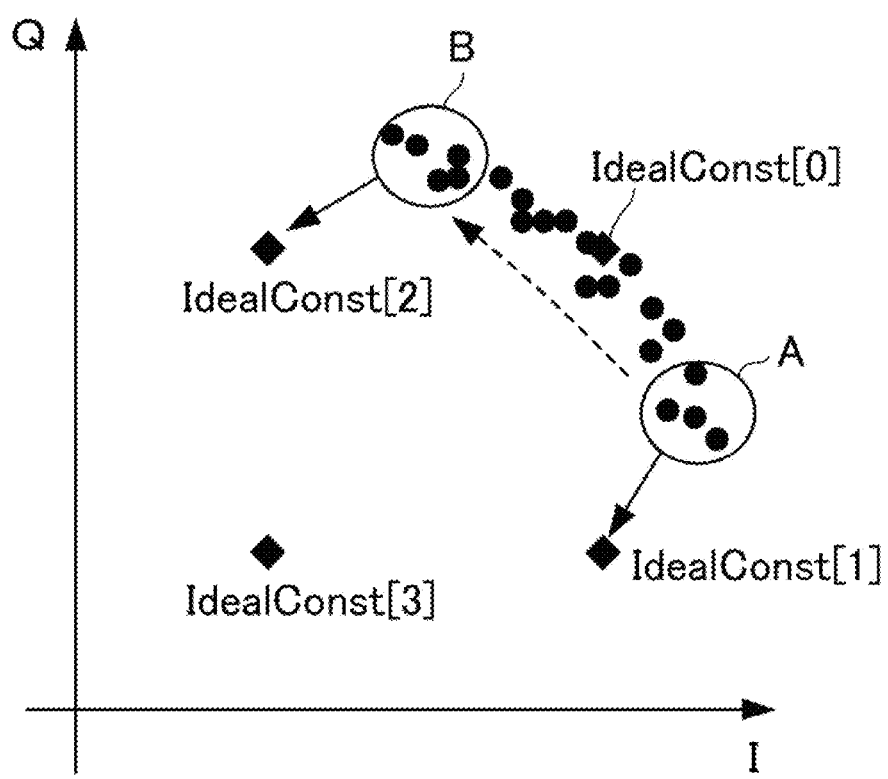
FIG. 3 is an explanatory diagram showing a state in which an abnormality in a phase error occurs due to phase rotation.

FIG. 3 is an explanatory diagram showing a state in which an abnormality in a phase error occurs due to phase rotation. If there is a frequency error in the components such as the DUT 2 and the reception unit 10, phase rotation Occurs in the IQ data string constituting the OFDM demodulation signal f as illustrated in FIG. 3. In the present specification, a phenomenon in which the phase error increases in proportion to the elapsed time with the passage of time is referred to as phase rotation.

In FIG. 3, the demodulation constellation points present around the ideal constellation point IdealConst[0] are spread out in an arc shape around the origin of the IQ plane. At this time, the demodulation constellation points present in the part A have a shorter distance from the ideal constellation point IdealConst[1] than the distance from the ideal constellation point IdealConst[0]. Further, the demodulation constellation points present in the part B have a shorter distance from the ideal constellation point IdealConst [2] than the distance from the ideal constellation point IdealConst[0]. Therefore, the demodulation constellation points present in the part A are erroneously recognized as having the corresponding ideal constellation points in IdealConst[1], and the demodulation constellation points present in the part B are erroneously recognized as having the corresponding ideal constellation points in IdealConst[2].

When the corresponding ideal constellation point is erroneously recognized in this way, the phase error deviates greatly from the original value, and the EVM also deviates from the true value. In the present embodiment, the transmission performance of the DUT 2 is tested by obtaining information on the true phase error by correcting the phase error caused by the phase rotation and obtaining a value such as EVM based on the information.

(Phase Error Correction Unit)

Next, the phase error correction unit 30 will be described.

The phase error correction unit 30 corrects the phase error of the OFDM demodulation signal f output from the demodulation unit 20, and includes a first-stage correction unit 31 and a second-stage correction unit 32. The first-stage correction unit 31 performs coarse correction of the phase error, and includes a demodulated constellation signal acquisition unit 311, a first ideal constellation signal generation unit 312, a data extraction unit 313, a first phase error calculation unit 314, a first phase error characteristic estimation unit 315, and a first phase error correction unit 316. The second-stage correction unit 32 performs main correction of the phase error, and includes a second ideal constellation signal generation unit 322, a second phase error calculation unit 324, a second phase error characteristic estimation unit 325, and a second phase error correction unit 326. The first ideal constellation signal generation unit 312, the first phase error calculation unit 314, the first phase error characteristic estimation unit 315, and the first phase error correction unit 316 of the present embodiment respectively correspond to the ideal constellation signal generation unit, the phase error calculation unit, the phase error characteristic estimation unit, and the phase error correction unit of the present invention. The second-stage correction unit 32 of the present embodiment corresponds to the second correction unit of the present invention. Hereinafter, each component will be described.

The demodulated constellation signal acquisition unit 311 of the first-stage correction unit 31 acquires the OFDM demodulation signal f from the subcarrier demodulation unit 22, and stores it as a demodulated constellation signal DemodConst[n]. Here, n is a data number, n=0, 1, . . . , and N−1, and N is the total number of data pieces. That is, the demodulated constellation signal is a discrete signal data string, and each piece of signal data is complex data having an I-phase component and a Q-phase component.

Figure 4:
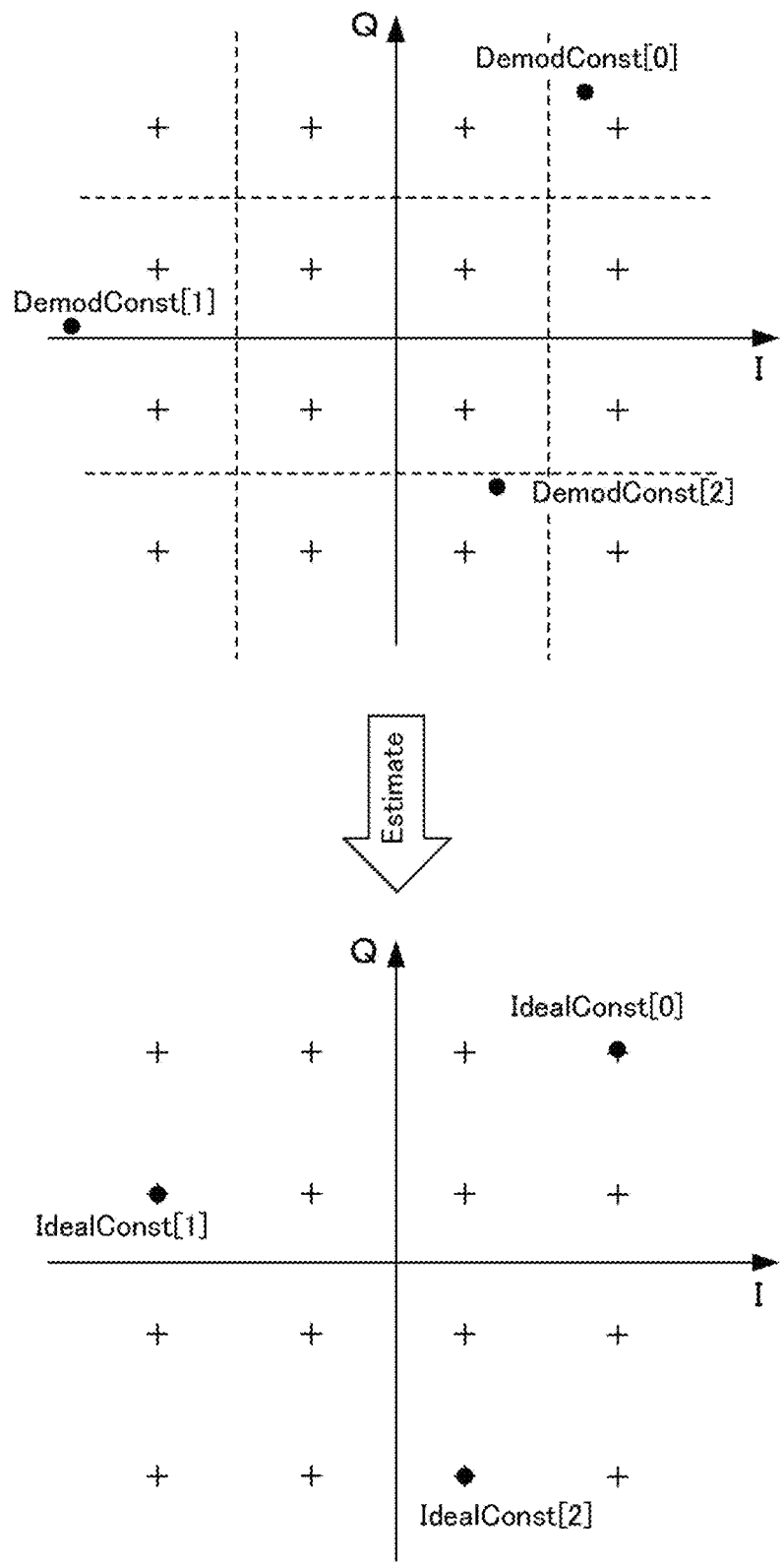
FIG. 4 is a diagram illustrating a method of generating an ideal constellation signal from a demodulated constellation signal.

The first ideal constellation signal generation unit 312 generates an ideal constellation signal IdealConst[n] from the demodulated constellation signal DemodConst[n]. FIG. 4 is a diagram illustrating a method of generating an ideal constellation signal from a demodulated constellation signal. In the upper diagram of FIG. 4, as an example, three pieces of signal data of the demodulated constellation signal, that is, DemodConst[0], DemodConst[1], and DemodConst[2], are plotted on the IQ plane. The ideal constellation on the IQ plane is indicated by a "+" mark.

In the lower diagram of FIG. 4, the closest ideal constellation points IdealConst[0], IdealConst[1], and IdealConst[2] are plotted on the IQ plane, from the constellation points of three pieces of signal data DemodConst[0], DemodConst[1], and DemodConst[2] of the demodulated constellation signal. That is, it is estimated that the three pieces of signal data DemodConst[0], DemodConst[1], and DemodConst[2] of the demodulated constellation signal correspond to the ideal constellation points IdealConst[0], IdealConst[1], and IdealConst[2], respectively. In this way, each piece of signal data IdealConst[n] of the closest ideal constellation signal on the IQ plane is generated from each piece of signal data DemodConst[n] of the demodulated constellation signal. Here, n=0, 1, . . . , and N−1, and N is the total number of data pieces.

The data extraction unit 313 selects and extracts a part of signal data suitable for a predetermined condition, from the demodulated constellation signal and the ideal constellation signal. Specifically, the data extraction unit 313 extracts signal data corresponding to subcarriers included in a part of an intermediate or central frequency section among all the frequency sections including all the subcarriers, from the demodulated constellation signal and the ideal constellation signal.

Figure 5:
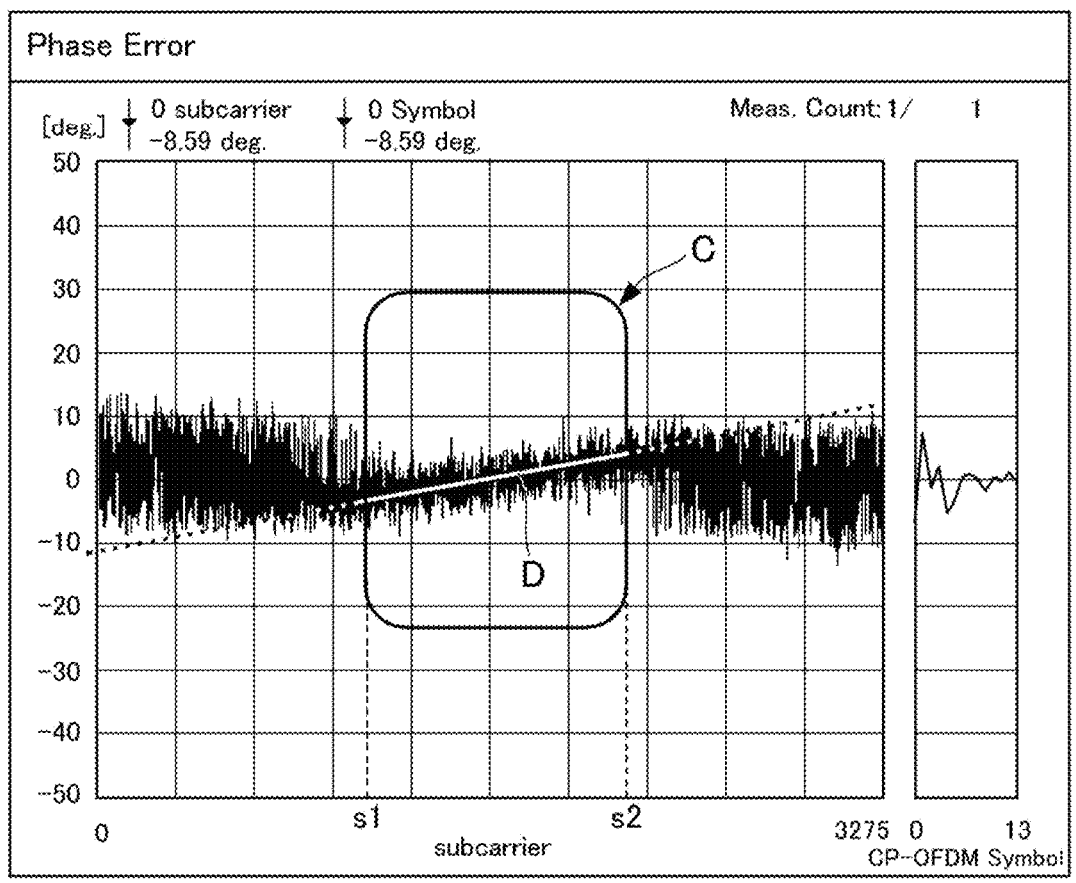
FIG. 5 is a diagram showing a graph of a phase error with respect to a subcarrier (frequency), in which an approximate straight line showing a set frequency section and a frequency characteristic of the phase error in the frequency section is shown.

FIG. 5 is a diagram showing a graph of the phase error with respect to the subcarrier (frequency) when the demodulation signal has a phase rotation. The horizontal axis is the subcarrier number, and as the subcarrier number increases, the frequency increases by the subcarrier interval. Therefore, the horizontal axis may be considered to represent the frequency. FIG. 5 illustrates a set frequency section C and an approximate straight line D showing the frequency characteristic of the phase error in the frequency section C.

FIG. 5 also illustrates a graph of phase error for CP-OFDM symbols (0 to 13) on the right side. Since the horizontal axis is the symbol number and the elapsed time increases as the symbol number increases, the horizontal axis may be considered to represent time.

For example, in FIG. 5, the data extraction unit 313 extracts signal data corresponding to the subcarriers (s1 to s2) included in a central frequency section C among all frequency sections including all subcarriers (0 to 3275). That is, the signal data DemodConst[m] and IdealConst[m] of the data number m satisfying s1≤subcarrier number≤s2 are extracted, respectively.

Assuming that signal data of p data numbers $m_1$, $m_2$, . . . , and $m_p$ are extracted, the extracted signal data is expressed as follows.

Demodulated constellation signal: DemodConst[$m_i$]

Ideal constellation signal: IdealConst[$m_i$]

Here, i=1, 2, . . . , and p.

The part of frequency section C is, but is not limited to, set to, for example, 20% to 40% of all the frequency sections, preferably, the center 30% of all the frequency sections, and more preferably, the center 20%. Further, the part of frequency section C does not necessarily need to be set in the center of all the frequency sections, may be set off the center if necessary, or may be set to include one end of all the frequency sections.

The first phase error calculation unit 314 calculates the phase error Phase Error[$m_i$] of the demodulated constellation signal with respect to the ideal constellation signal, with respect to the extracted signal data. Here, i=1, 2, . . . , and p (p is the number of extracted data pieces).

Specifically, the phase of the signal data of the data numbers $m_1$, $m_2$, . . . , and $m_p$ is expressed by the following equation.

$$\text{Demodulated constellation signal: DemodPhase}[m_i] = \arg(\text{DemodConst}[m_i]) \quad (1)$$

$$\text{Ideal constellation signal: IdealPhase}[m_i] = \arg(\text{IdealConst}[m_i]) \quad (2)$$

Here, i=1, 2, . . . , and p (p is the number of extracted data pieces).

Therefore, for each piece of signal data extracted from the demodulated constellation signal, the phase error from each piece of signal data of the corresponding ideal constellation signal is expressed as follows.

$$\text{PhaseError}[m_i] = \text{DemodPhase}[m_i] - \text{IdealPhase}[m_i] = \arg(\text{DemodConst}[m_i]) - \arg(\text{IdealConst}[m_i]) \quad (3)$$

Here, i=1, 2, . . . , and p (p is the number of extracted data pieces).

The first phase error characteristic estimation unit 315 estimates the frequency characteristic of the phase error based on the calculated phase error. Specifically, for example, as illustrated in FIG. 5, the frequency characteristic of the phase error in the frequency section C is approximated by the straight line D. The straight line D represented by the linear equation can be obtained by, for example, the least squares method. The straight line D representing the frequency characteristic of the phase error is interpolated as indicated by a broken line outside the frequency section C and can be applied to all frequency sections.

The first phase error correction unit 316 corrects the phase error of the demodulated constellation signal in all the frequency sections, based on the frequency characteristic of the phase error.

Specifically, the first phase error correction unit 316 corrects the phase error by rotating the phase of the demodulated constellation signal in all the frequency sections such that the inclination of the straight line D that approximates the frequency characteristic of the phase error zero, that is, the straight line D is parallel to the frequency axis (horizontal axis). By obtaining the demodulated constellation signal of which the phase error has been corrected in this way, an accurate ideal constellation signal can be obtained by the second ideal constellation signal generation unit 322 to be described later. In other words, the first-stage correction unit 31 is to obtain a more accurate ideal constellation signal.

Next, the second-stage correction unit 32 that performs the main correction of the phase error will be described.

The second phase error calculation unit 324 in the second-stage correction unit 32 calculates a phase error between the demodulated constellation signal of which phase error has been corrected by the first phase error correction unit 316 and an ideal constellation signal which is regenerated from the demodulated constellation signal of which phase error has been corrected, estimates a frequency characteristic of a phase error, based on the calculated phase error, and corrects a phase error of the demodulated constellation signal, based on the estimated frequency characteristic of the phase error.

Specifically, the second ideal constellation signal generation unit 322 regenerates the ideal constellation signal, by specifying the ideal constellation point closest to each piece of signal data on the IQ plane, from the demodulated constellation signal of which phase error has been corrected by the first phase error correction unit 316.

The second phase error calculation unit 324 calculates the phase error between the demodulated constellation signal of which phase error has been corrected by the first phase error correction unit 316 and the ideal constellation signal regenerated by the second ideal constellation signal generation unit 322.

The second phase error characteristic estimation unit 325 obtains an approximate straight line showing the frequency characteristic of the phase error in all the frequency sections, for example, by the least squares method, from the phase error calculated by the second phase error calculation unit 324.

The second phase error correction unit 326 corrects again the phase error of the demodulated constellation signal of which phase error is corrected by the first phase error correction unit 316, based on the frequency characteristic of the phase error estimated by the second phase error characteristic estimation unit 325. The demodulated constellation signal of which phase error has been corrected by the second phase error correction unit 326 is sent to the analysis unit 40 as an OFDM demodulation signal s of which phase error has been corrected.

The demodulated constellation signal of which phase error has been coarsely corrected by the first-stage correction unit 31 may be sent to the analysis unit 40 for signal analysis as the OFDM demodulation signal s of which phase error has been corrected.

The mobile terminal test apparatus 1 and the receiving device 100 according to the present embodiment include individually or as a whole, computers including, for example, a Central Processing Unit (CPU), a Read Only Memory (ROM), a Random Access Memory (RAM), an input/output interface, a storage device such as a hard disk, and the like. Thus, for example, some or all of the functions of the reception unit 10, the demodulation unit 20, the phase error correction unit 30, the analysis unit 40, the display unit 50, the control unit 60, the operation unit 70, and the like can be achieved by reading the various processing programs stored in the ROM or the storage device into the RAM and executing the programs in the CPU. For example, the control unit 60 may be a computer.

Figure 7:
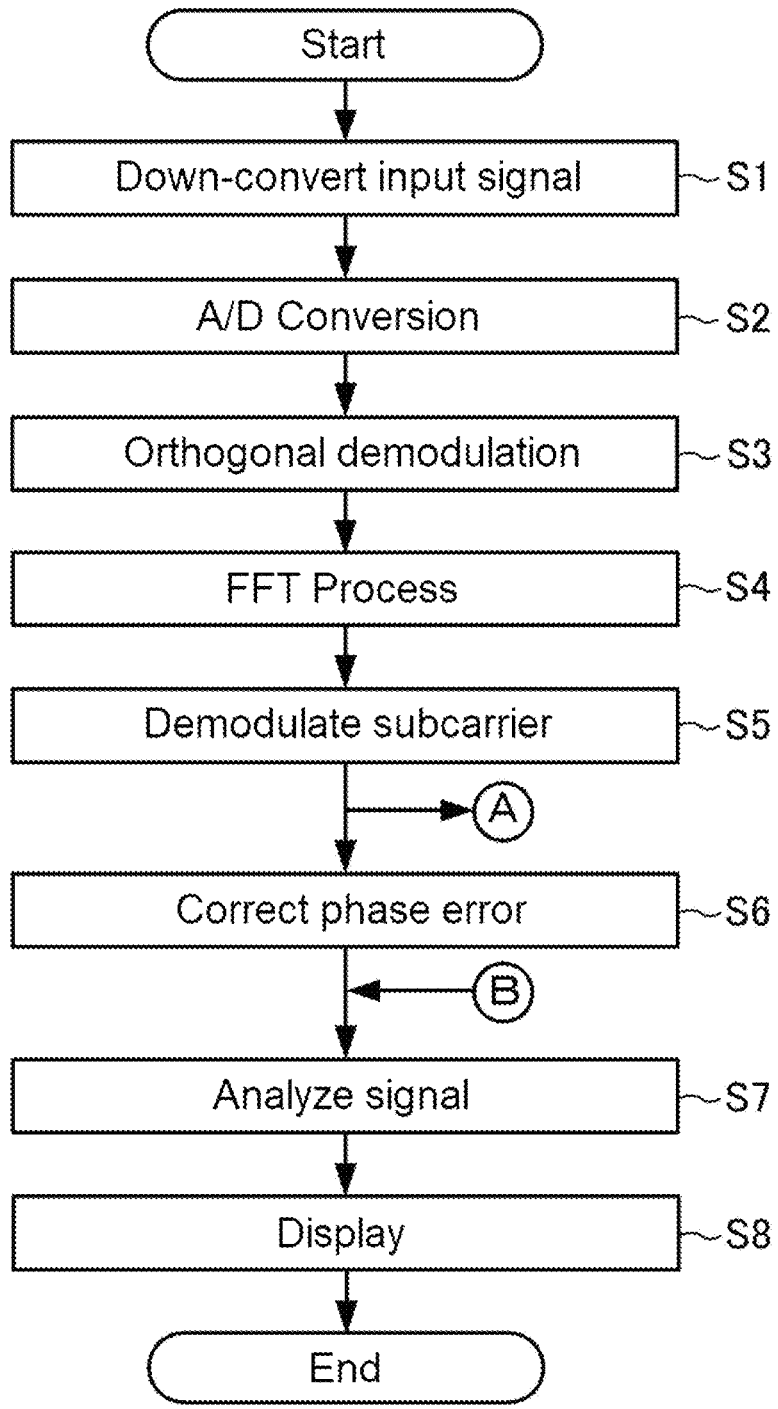
FIG. 7 is a diagram showing a flowchart of a mobile terminal test performed by using the mobile terminal test apparatus according to an embodiment.

Next, a mobile terminal test method performed using the mobile terminal test apparatus 1 according to the present embodiment will be described with reference to FIGS. 1 and 7.

The DUT 2 transmits a modulation signal a modulated by the OFDM modulation method.

The reception unit 10 receives the modulation signal a via the antenna or by wire and inputs the modulation signal a to the down converter 11.

The down converter 11 down-converts the modulation signal a transmitted from the DUT 2 into an intermediate frequency signal b having an intermediate frequency (step S1). The intermediate frequency signal b is sent to the ADC 12.

The ADC 12 samples the analog intermediate frequency signal b to generate the digital intermediate frequency signal c (step S2). Sampling is performed, for example, 14640 times, 30720 times, or 61440 times per 14 symbols (1 slot). The digital intermediate frequency signal c is sent to the orthogonal demodulation unit 13.

The orthogonal demodulation unit 13 orthogonally demodulates the digital intermediate frequency signal c sent from the ADC 12 to the baseband signal to generate an orthogonal demodulation signal d (step S3). The orthogonal demodulation signal d is a complex signal in the time domain and has an I-phase component and a Q-phase component. The orthogonal demodulation signal d is sent to the FFT unit 21 of the demodulation unit 20.

The FFT unit 21 performs a fast Fourier transform on the orthogonal demodulation signal d of the time domain output by the orthogonal demodulation unit 13 to acquire the frequency domain signal e (step S4). The frequency domain signal e is sent to the subcarrier demodulation unit 22.

The subcarrier demodulation unit 22 performs a demodulation process for each subcarrier from the frequency domain signal e to acquire the OFDM demodulation signal f (step S5). The demodulation process for each subcarrier is a demodulation process corresponding to the modulation method performed for each subcarrier in the DUT 2, and examples thereof include Binary Phase Shift Keying (BPSK), Quadrature Phase Shift Keying (QPSK), 8 Phase Shift Keying (PSK), 16 Quadrature Amplitude Modulation (QAM), 64QAM, and the like. The OFDM demodulation signal f is sent to the phase error correction unit 30.

The phase error correction unit 30 corrects the phase error of the OFDM demodulation signal f, as will be described in detail later (step S6). The OFDM demodulation signal s of which phase error has been corrected is sent to the analysis unit 40.

The analysis unit 40 measures and analyzes, for example, transmission power, EVM, constellation, spectrum, and the like with respect to the OFDM demodulation signal s of which phase error has been corrected by the phase error correction unit 30 (step S7).

The display unit 50 displays information t such as measurement and analysis result data and graphs obtained by the analysis unit 40 in step S7 (step S8).

Figure 8:
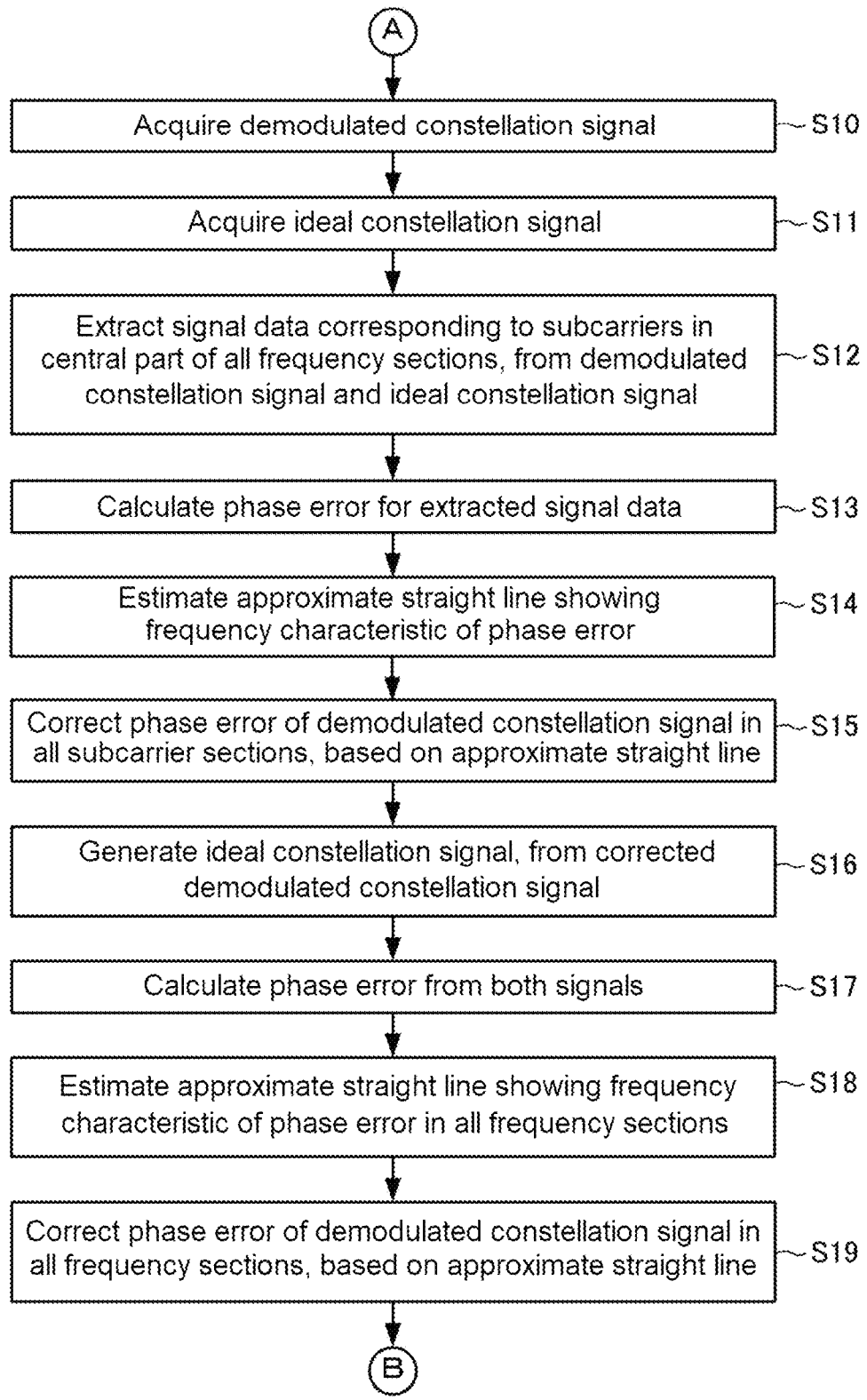
FIG. 8 is a diagram showing a flowchart of a mobile terminal test performed by using the mobile terminal test apparatus according to an embodiment.

Next, the phase error correction process will be described with reference to FIGS. 1 and 8.

In the phase error correction unit 30, the demodulated constellation signal acquisition unit 311 acquires the OFDM demodulation signal f as a "demodulated constellation signal" from the subcarrier demodulation unit 22 of the demodulation unit 20 and stores it (step S10). The demodulated constellation signal g is a complex digital signal having an I-phase component and a Q-phase component. The demodulated constellation signal g is sent to the first ideal constellation signal generation unit 312 and the data extraction unit 313.

The first ideal constellation signal generation unit 312 generates the ideal constellation signal h from the demodulated constellation signal g (step S11). Specifically, the first ideal constellation signal generation unit 312 generates an ideal constellation signal h, by obtaining the ideal constellation point having the closest distance on the IQ plane, for each piece of signal data of the demodulated constellation signal. The ideal constellation signal h is sent to the data extraction unit 313.

The data extraction unit 313 extracts signal data corresponding to the subcarriers included in a part of central frequency section among all the frequency sections including all subcarriers, from the demodulated constellation signal and the ideal constellation signal (step S12). The frequency section from which the signal data is extracted is a section where the frequency characteristic of the phase error is significantly shown, and is, for example, a section of the center 20% of all frequency sections. The frequency section from which the signal data is extracted also changes depending on the modulation method of the subcarrier, and generally, the larger a multivalency, the narrower a frequency section. The frequency section from which the signal data is extracted may be set by the user via the operation unit 70, Or may be set based on a predetermined standard, by measuring EVM or phase error in all frequency sections, and comparing the average value with a predetermined threshold value.

The first phase error calculation unit 314 calculates the phase error for the signal data extracted from the demodulated constellation signal and the ideal constellation signal by the data extraction unit 313 (step S13).

The first phase error characteristic estimation unit 315 estimates an approximate straight line showing a relationship between the phase error and the frequency (that is, the frequency characteristic of the phase error), from the phase error data calculated by the first phase error calculation unit 314 in a part of set frequency section (step S14).

The first phase error correction unit 316 corrects the phase error of the demodulated constellation signal in all the frequency sections, by using the approximate straight line obtained by the first phase error characteristic estimation unit 315 (step S15). Specifically, the phase of each piece of signal data of the demodulated constellation signal is rotated such that the slope of the approximate straight line indicating the frequency characteristic of the phase error becomes zero. In this way, the first-stage correction unit 31 "coarsely corrects" the phase error of the demodulation signal by using the data signal in a part of frequency section among all the frequency sections.

Next, the second ideal constellation signal generation unit 322 of the second-stage correction unit 32 regenerates the ideal constellation signal, from the demodulated constellation signal of which phase error has been corrected by the first phase error correction unit 316, in the same way as the first ideal constellation signal generation unit 312 (step S16).

The second phase error calculation unit 324 calculates the phase error in all frequency sections, from the demodulated constellation signal of which phase error has been corrected by the first phase error correction unit 316 and the ideal constellation signal regenerated by the second ideal constellation signal generation unit 322 (step S17).

The second phase error characteristic estimation unit 325 estimates an approximate straight line showing the frequency characteristic of the phase error in all the frequency sections, from the phase error calculated by the second phase error calculation unit 324 (step S18).

The second phase error correction unit 326 corrects the phase error of the demodulated constellation signal in all the frequency sections, based on the approximate straight line estimated by the second phase error characteristic estimation unit 325 (step S19). In this way, the second-stage correction unit 32 acquires the frequency characteristic of the phase error by using the data signals in all the frequency sections, and "mainly corrects" the phase error based on the frequency characteristic. The demodulated constellation signal of which phase error has been corrected is sent to the analysis unit 40. The demodulated constellation signal of which phase error is coarsely corrected by the first-stage correction unit 31 may be sent to the analysis unit 40 for signal analysis.

Figure 6A:
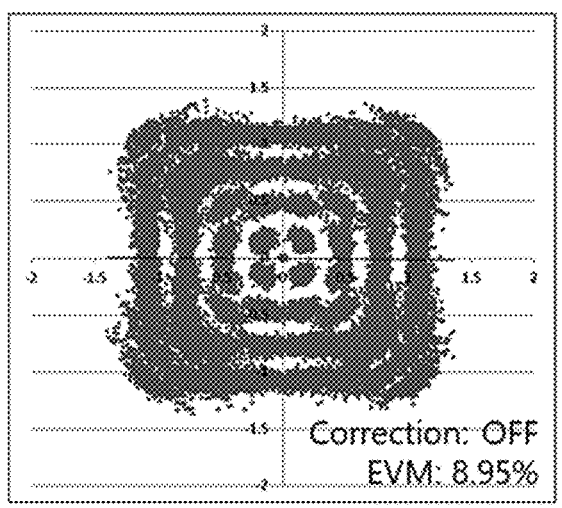
FIG. 6A illustrates a constellation when the phase error of the demodulation signal is not corrected.
Figure 6B:
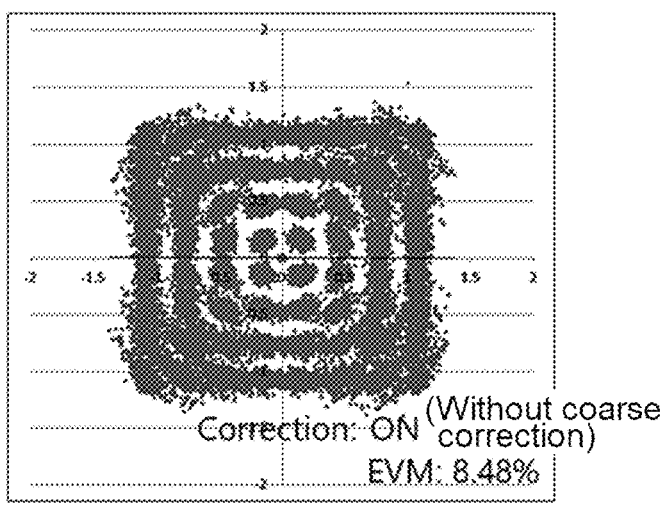
FIG. 6B illustrates a constellation when the phase error is corrected by using signal data in all frequency sections.
Figure 6C:
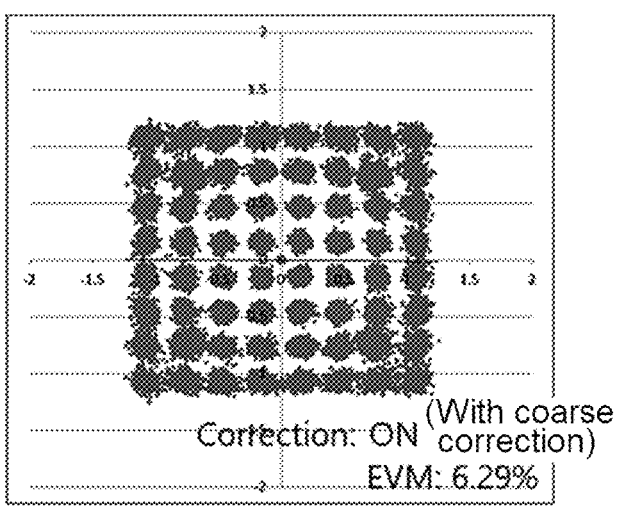
FIG. 6C illustrates a constellation when the phase error is corrected by using only signal data in a part of central frequency section.

FIG. 6A illustrates the constellation of the demodulation signal when the phase error is not corrected. When the phase error is not corrected, an abnormality of the phase error due to the phase rotation appears in the constellation, and the constellation is disturbed. FIG. 6B illustrates a constellation when the frequency characteristic of the phase error is obtained using the signal data in all the frequency sections and the phase error is corrected based on the frequency characteristic (only main correction is performed, and coarse correction is not performed). The constellation is improved compared to the case where the phase error is not corrected, but the constellation is still disturbed at the four peripheral corners. FIG. 6C illustrates the constellation of the demodulation signal when the coarse correction is performed before the main correction is performed, according to the present embodiment. It can be seen that the constellation is not disturbed as compared with the case of only the main correction illustrated in FIG. 6B, and the improvement is significant as compared with the case where only the main correction is performed.

Next, the action and effect will be described.

As described above, in the receiving device 100 and the mobile terminal test apparatus 1 according to the present embodiment, the data extraction unit 313 extracts signal data corresponding to subcarriers included in a part of central frequency section among all the frequency sections including all the subcarriers, from the demodulated constellation signal and the ideal constellation signal. With respect to the extracted signal data, the first phase error calculation unit 314 calculates the phase error, and the first phase error characteristic estimation unit 315 estimates the frequency characteristic of the phase error in the section of the extracted signal data. Then, the first phase error correction unit 316 corrects the phase error of the demodulated constellation signal, based on the estimated frequency characteristic of the phase error. In this way, since the frequency characteristic of the phase error can be estimated using only a part of the highly reliable signal data, by correcting the phase error based on the characteristics, the phase error of the demodulation signal can be corrected accurately and efficiently.

Further, in the receiving device 100 and the mobile terminal test apparatus 1 according to the present embodiment, after the first-stage correction unit 31 estimates the frequency characteristic of the phase error using only a part of the highly reliable signal data and performs coarse correction of the phase error based on the frequency characteristic, the second-stage correction unit 32 can correct the phase error of the demodulation signal accurately and efficiently, by estimating the frequency characteristic of the phase error using signal data included in all the frequency sections (all subcarrier sections) and performing the main correction of the phase error based on the frequency characteristic. In particular, since the ideal constellation signal is regenerated after the coarse correction of the phase error, the phase error is calculated based on the more accurate ideal constellation signal, so that it is possible to estimate the frequency characteristic of the phase error more accurately.

As described above, the present invention has an effect of being able to accurately and efficiently correct the phase error of the demodulation signal, and is useful for a receiving device, a receiving method, and a mobile terminal test apparatus provided with the receiving device in general.

DESCRIPTION OF REFERENCE NUMERALS AND SIGNS

1 Mobile terminal test apparatus
2 DUT (mobile communication terminal)
10 Reception unit
11 Down converter
12 ADC
13 Orthogonal demodulation unit
20 Demodulation unit
21 FFT unit
22 Subcarrier demodulation unit
30 Phase error correction unit
31 First-stage correction unit
311 Demodulated constellation signal acquisition unit
312 First ideal constellation signal generation unit (ideal constellation signal generation unit)
313 Data extraction unit
314 First phase error calculation unit (phase error calculation unit)
315 First phase error characteristic estimation unit (phase error characteristic estimation unit)
316 First phase error correction unit (phase error correction unit)
32 Second-stage correction unit (second correction unit)
322 Second ideal constellation signal generation unit
324 Second phase error calculation unit
325 Second phase error characteristic estimation unit
326 Second phase error correction unit
40 Analysis unit
50 Display unit
60 Control unit
70 Operation unit
100 Receiving device
a Modulation signal
b Intermediate frequency signal
c Digital intermediate frequency signal
d Orthogonal demodulation signal
e Frequency domain signal
f OFDM demodulation signal (demodulated constellation signal, demodulation signal)
s OFDM demodulation signal of which phase error has been corrected

What is claimed is:

1. A receiving device comprising:
a receiver configured to receive a modulation signal modulated by an orthogonal frequency division multiplexing (OFDM) method; and
a processor configured to:
demodulate the received modulation signal to acquire a demodulated constellation signal;
generate an ideal constellation signal corresponding to the demodulated constellation signal;
select and extract each part of signal data from the demodulated constellation signal and the ideal constellation signal,
calculate a first phase error of the demodulated constellation signal with respect to the ideal constellation signal by comparing each extracted part of the signal data, estimate a first frequency characteristic of the first phase error, based on the calculated first phase error, and
correct the first phase error of the demodulated constellation signal based on the estimated first frequency characteristic of first the phase error.

2. The receiving device according to claim 1, wherein the processor is further configured to extract each part of the signal data corresponding to subcarriers included in a part of an intermediate frequency section among all frequency sections including all subcarriers, from the demodulated constellation signal and the ideal constellation signal.

3. The receiving device according to claim 2, wherein the processor is further configured to:
calculate a second phase error between the demodulated constellation signal of which the first phase error has been corrected and an ideal constellation signal which is regenerated from the demodulated constellation signal of which the first phase error has been corrected, estimate a second frequency characteristic of the second phase error, based on the calculated second phase error, and correct the second phase error of the demodulated constellation signal of which the first phase error has been corrected based on the estimated second frequency characteristic of the second phase error.

4. The receiving device according to claim 1, wherein the processor is further configured to:

calculate a second phase error between the demodulated constellation signal of which the first phase error has been corrected and an ideal constellation signal which is regenerated from the demodulated constellation signal of which the first phase error has been corrected, estimate a second frequency characteristic of the second phase error, based on the calculated second phase error, and correct the second phase error of the demodulated constellation signal of which the first phase error has been corrected based on the estimated second frequency characteristic of the second phase error.

5. A mobile terminal test apparatus comprising:

a receiver configured to receive a modulation signal modulated by an orthogonal frequency division multiplexing (OFDM) method from a mobile communication terminal;

a processor configured to:
  demodulate the received modulation signal to acquire a demodulated constellation signal;
  generate an ideal constellation signal from the demodulated constellation signal,
  select and extract each part of signal data from the demodulated constellation signal and the ideal constellation signal,
  calculate a first phase error of the demodulated constellation signal with respect to the ideal constellation signal by comparing each extracted part of the signal data, estimate a first frequency characteristic of the first phase error, based on the calculated first phase error,
  correct the phase error of the demodulated constellation signal based on the estimated frequency characteristic of the first phase error, and
  analyze the demodulated constellation signal of which the first phase error has been corrected; and a display configured to display a result of an analysis of the demodulated constellation signal of which the first phase error has been corrected.

6. The mobile terminal test apparatus according to claim 5, wherein the processor is further configured to extract each part of the signal data corresponding to subcarriers included in a part of an intermediate frequency section among all frequency sections including all subcarriers, from the demodulated constellation signal and the ideal constellation signal.

7. The mobile terminal test apparatus according to claim 6, wherein the processor is further configured to:

calculate a second phase error between the demodulated constellation signal of which the first phase error has been corrected and an ideal constellation signal which is regenerated from the demodulated constellation signal of which the first phase error has been corrected, estimate a second frequency characteristic of the second phase error, based on the calculated second phase error, and correct the second phase error of the demodulated constellation signal of which the first phase error has been corrected based on the estimated second frequency characteristic of the second phase error.

8. The mobile terminal test apparatus according to claim 5, wherein the processor is further configured to:

calculate a second phase error between the demodulated constellation signal of which the first phase error has been corrected and an ideal constellation signal which is regenerated from the demodulated constellation signal of which the first phase error has been corrected, estimate a second frequency characteristic of the second phase error, based on the calculated second phase error, and correct the second phase error of the demodulated constellation signal of which the first phase error has been corrected based on the estimated second frequency characteristic of the second phase error.

9. A receiving method comprising:

receiving a modulation signal modulated by an orthogonal frequency division multiplexing (OFDM) method;

demodulating the received modulation signal to acquire a demodulated constellation signal;

generating an ideal constellation signal from the demodulated constellation signal;

selecting and extracting each part of signal data from the demodulated constellation signal and the ideal constellation signal;

calculating a phase error of the demodulated constellation signal with respect to the ideal constellation signal by comparing each extracted part of the signal data;

estimating a frequency characteristic of the phase error, based on the calculated phase error; and correcting the phase error of the demodulated constellation signal based on the estimated frequency characteristic of the phase error.

* * * * *